United States Patent [19]

Orlowski et al.

[11] 4,232,630

[45] Nov. 11, 1980

[54] ANIMAL EXERCISER

[75] Inventors: Gerald J. Orlowski, Scottsdale, Ariz.; Thomas E. Dugle, Cincinnati, Ohio

[73] Assignee: Fun-Tech Products Company, Phoenix, Ariz.

[21] Appl. No.: 9,375

[22] Filed: Feb. 2, 1979

[51] Int. Cl.³ .............................................. A01K 15/00
[52] U.S. Cl. ...................................... 119/29; 119/120
[58] Field of Search .......................... 119/29, 120, 121; 272/70; 128/25 R

[56] References Cited

U.S. PATENT DOCUMENTS

| | | | |
|---|---|---|---|
| 1,956,937 | 5/1934 | Van Kleek | 119/29 |
| 2,500,805 | 3/1950 | Costello | 119/29 |
| 2,871,915 | 2/1959 | Hogan | 119/29 |
| 3,203,399 | 8/1965 | Banks | 119/121 |
| 3,291,099 | 12/1966 | Crane et al. | 119/29 |
| 3,324,832 | 6/1967 | McCain | 119/29 |
| 3,349,751 | 10/1967 | Frostad | 119/29 |
| 3,965,866 | 6/1976 | Lorentz et al. | 119/29 |
| 4,138,966 | 2/1979 | Hesnault | 119/29 |

*Primary Examiner*—Jay N. Eskovitz
*Attorney, Agent, or Firm*—Charles E. Cates

[57] ABSTRACT

An animal exerciser especially well suited to horses that provides means for straight line exercising and positive turning in apparatus including a carriage, means for reciprocally moving the carriage in a substantially straight line, means for attaching the animal to the carriage, and means for supporting the operative elements at a desired height. A preferred embodiment has an endless belt and means connecting an anchor point on the belt to alternating positions on the carriage whereby the direction of travel of the carriage is reversed at each end of the line of travel.

9 Claims, 10 Drawing Figures

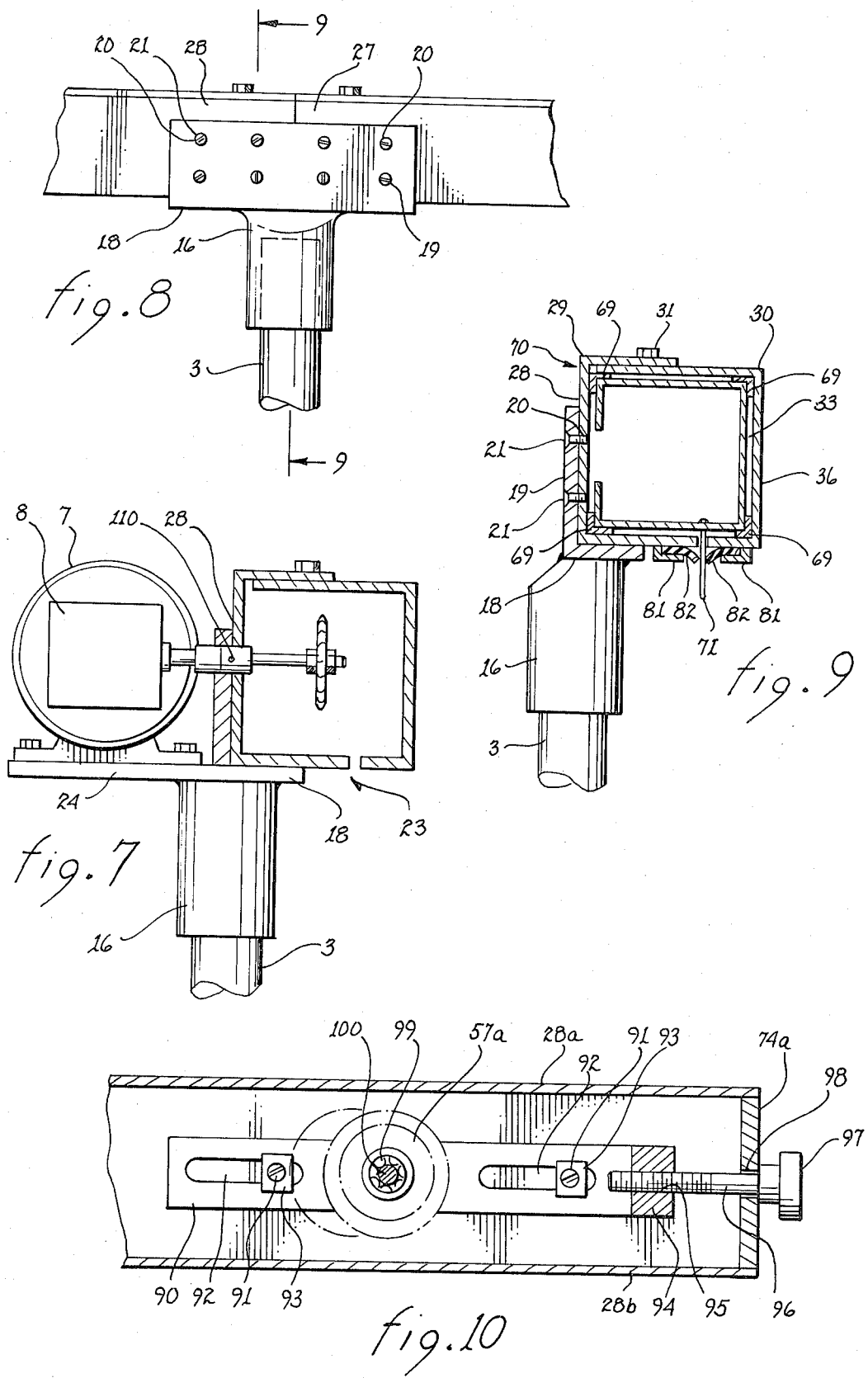

ANIMAL EXERCISER

BACKGROUND OF THE INVENTION

This invention relates to improvements in apparatus for exercising animals, especially, but not exclusively, large animals such as horses.

THE PRIOR ART

The animal exercisers presently in the art are known as horse walkers. A motor moves a wand in a circular track to encourage the horse or other animal to be exercised to follow the wand. Among the shortcomings of the prior art apparati are that (a) the continuous circular movement (in a somewhat tight circle) fosters shoulder muscle problems severe enough to require veterinary treatment. Also, a horse needs definite turning movement exercise, both right and left, that cannot be provided by a circular walker; (b) this circular wand moving apparatus, by its nature, is not powerful enough to move a stubborn, unwilling horse or one that is ill.

In the latter connection one of the needs for walking a horse is occasioned by the horse's ingestion of dirt and gravel along with natural vegetation and spilled feed. Because of the anatomical structure of the horse's digestive system, the non-digestible matter settles in a part of the digestive tract and causes the horse to get colic and want to lie down. The horse must be walked until the non-digestible matter is defecated, or he will die. Ordinarily a strong man (sometimes two) is required to keep the horse going for as much as twelve hours or more.

There are other desirable functions in animal training that the prior art horse walkers cannot be directed to at all. There is no exerciser known to the inventor that can be adapted to automatically train a horse (or other animal) to walk at a desired pace and start, stop and turn left or right responsive to the selected signal, as for example, a voice command.

BRIEF SUMMARY OF THE INVENTION

With the object of overcoming the stated defects of the prior art devices, and providing an apparatus adaptable to more flexible and versatile employment, I have invented an animal exerciser described in the following paragraphs.

Briefly, I provide an apparatus for exercising and training animals, with particular reference to horses, but not exclusively confined to that purpose. The apparatus has a carriage, means for attaching the animal to the carriage, transportation means adapted to support and reciprocally move the carriage along a substantially straight line of travel and frame means for supporting the transportation means and its associated carriage.

In a preferred embodiment the transportation means has an endless belt having first and second courses which travel in opposite directions, typically an upper run of the belt going one direction and a lower run of the belt going in the opposite direction. The transportation means also has means for moving the belt, conveniently a direct current variable speed motor whose power take-off shaft is operatively connected to a drive wheel connected to the belt. The belt is connected to means for moving and reversing the direction of the carriage which may conveniently be a connecting member having a first part engaging the carriage and a second part engaging an anchor point on the endless belt, the first part being adapted to move from a first carriage engaging position to a second carriage engaging position responsive to the movement of the anchor point between the first and second courses.

Preferably, the means for accomplishing the reversal is a pin carried by the endless belt at the anchor point which has one or more projecting ends, preferably two. The projecting ends of the pin engage a race or slot communicating between the first and second carriage engaging positions. The race means are operatively associated with the carriage and adapted to engage the pin in such a manner that the pin moves in the race from one carriage engaging position to the other as the anchor point moves from one course to the other, whereby the direction of travel of the carriage is reversed because it is passed from the control of the run of the belt going in one direction to the run of the belt going in the opposite direction. Preferably, idler rollers will be provided to support an upper reach of the belt. This presents a special problem which is solved by making one of the races discontinuous in the center position which thereby defines two pockets, one at the first carriage engaging position and the second pocket at the second carriage engaging position. Thus, when the carriage passes an idler roller the roller passes through the discontinuous portion of the race and through a portion of a carriage relieved for that purpose. Nevertheless, when the anchor point rounds one of the sprockets supporting the belt at either end of the course of travel, the second end of the pin transfers from one pocket to another and is reliably guided by the end of the pin in the other race.

The frame means has a housing member which is adapted to receive and moveably support the carriage, and a slot in the housing along the line of travel that is adapted to receive the means for attaching the animal to the carriage. Also provided are support means for supporting and anchoring the apparatus at any desired elevation. Preferably, the housing member has a first portion which is firmly anchored to the support means and a second portion which is removeably joined to the first portion by any convenient means.

A preferred source of power will be 220 volt alternating current which may be fed through a rectifier to convert the alternating current to direct current and which can also control the speed of the motor by regulating the voltage fed to the armature of the motor. A timer can be interposed either between the source of alternating current and the rectifier or between the rectifier and the motor.

Also means are provided for adjusting the tension on the belt or chain.

And lastly, the means for moveably supporting the carriage in the housing may be any convenient means such as bearings or wear strips.

DETAILED DESCRIPTION OF THE PREFERRED EMBODIMENT

Turning now to the drawings in which a presently preferred embodiment of the invention is shown:

FIG. 7 is an end view of the apparatus, partly cut away, viewed from the motor end;

FIG. 8 is a view from a segment of the back side of the apparatus at the juncture of the sections;

FIG. 9 is a section view of the view of FIG. 8 taken along the lines 9—9; and

FIG. 10 is a view of a chain slack take up means at the idler sprocket end, with the cover removed, shown partly in phantom outline.

Figure 1:
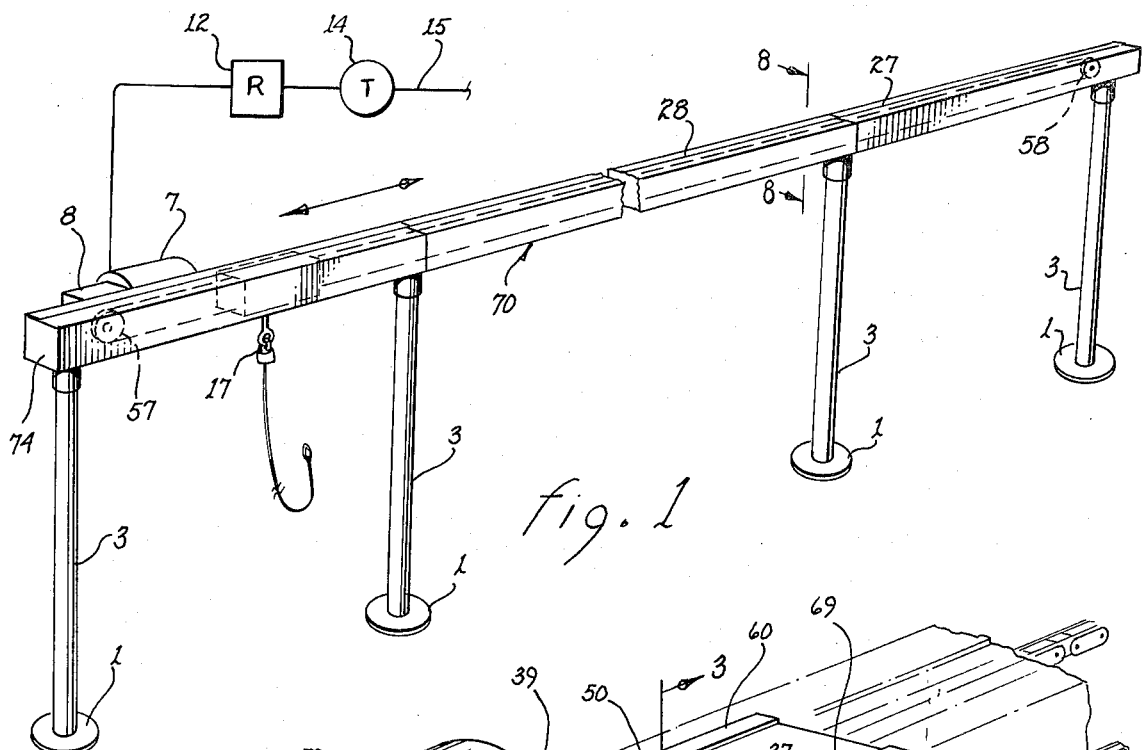
FIG. 1 is a perspective view of the apparatus.

Turning now to FIG. 1, attention is called to the general construction of the apparatus which in this illustration is shown firmly embedded in the ground and anchored with concrete footings 1. The size and configuration of the footings will depend upon the size of the apparatus, the type of ground in which it is embedded, and other factors. It should also be noted that when the apparatus is installed near an existing building or fence it may be further braced by connecting to the building or the fence. The unit is about seven feet tall, on a forty foot long embodiment. Five posts 3, one at each end and three intermediate the ends at the juncture of the four ten-foot sections of housing, are used.

Capping each support post 3 is a sleeve 16 to which is welded the short leg 17 of a length of angle iron 18. The longer vertical leg 19 is provided with holes 20 for the reception of flat head screws 21 in tapped bore 22. At the motor supporting end 23 the angle iron 18 is in the form of a "T" shape providing a shelf 24 for the carriage of the motor 7 and associated gear box 8 which are bolted to the shelf 24 as shown in FIG. 7.

As shown in FIG. 8 the angle iron 18 is provided with eight holes which register with four holes in the ends of each of the adjoining sections 27, 28. Thus, two sections are joined together with flat head screws 21 and supported by the post 3 and the angle iron 18.

In FIG. 9 the manner of joining is shown in greater detail where the angle iron 18 and sleeve 16 are sectioned near the point where section 28 joins section 27. The ends of sections of rear C-members 29 are seen to rest on the short leg 17 and are bolted to the vertical leg 19. Rear C-member 29 in turn supports removeable C-member 30 which provides a cover for the internal workings of the apparatus. Removeable C-member 30 is bolted to C-member 29 by bolts 31. The one is suitably tapped to receive the thread of the bolt and the other is provided with a clearance hole.

Over each end of the housing a plate 74 is fastened to seal the housing by flat headed screws (not shown).

Figure 2:
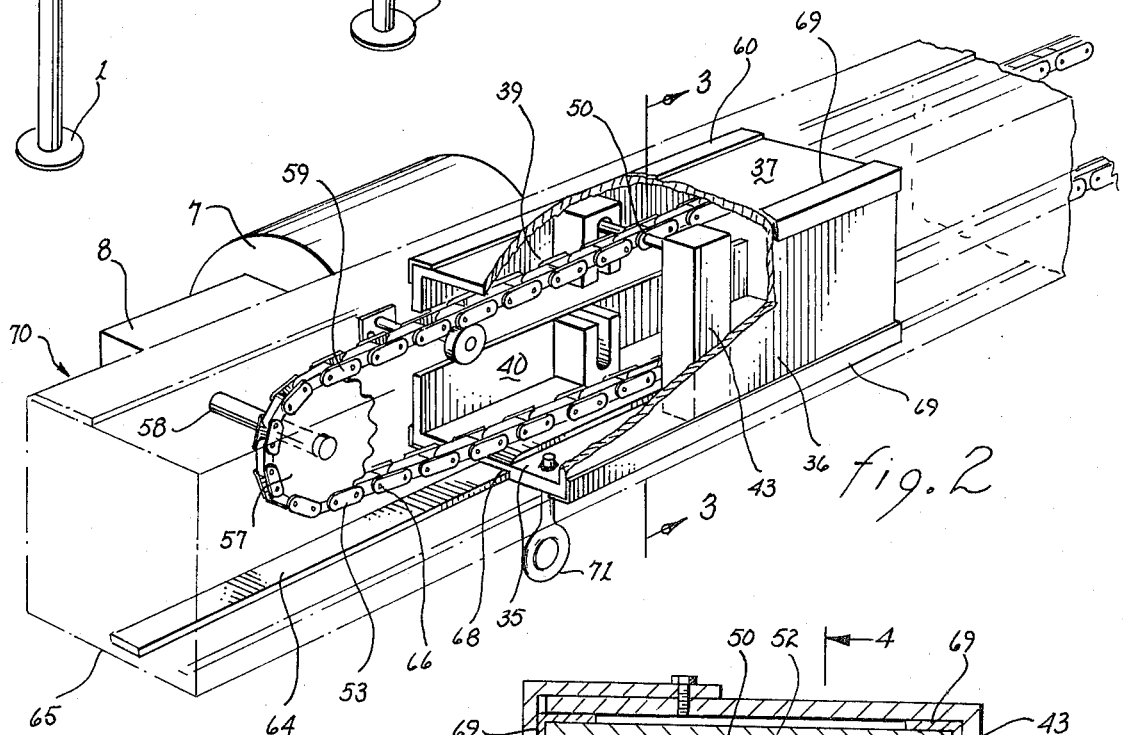
FIG. 2 is an enlarged view of one end of the apparatus with the housing shown in phantom outline and a portion of the carriage broken away to show the interior elements.
Figure 3:
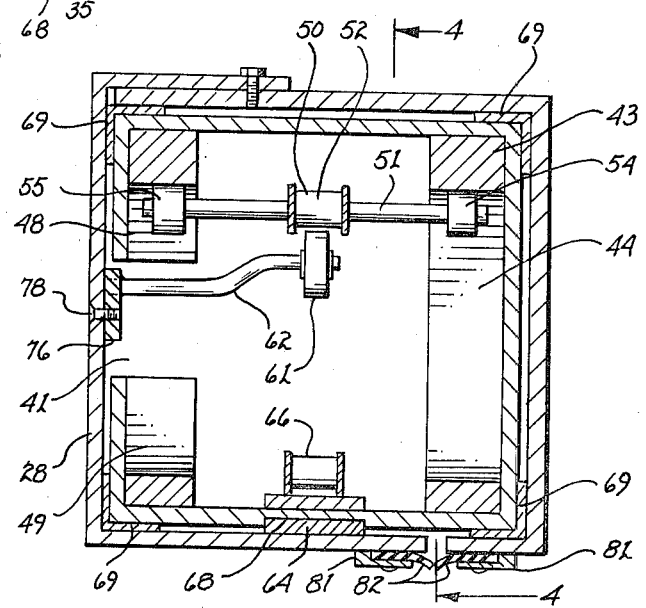
FIG. 3 is a view of the apparatus as shown in FIG. 2, in section, taken along the lines 3—3.

Turning now to FIG. 2 in which the carriage is shown in detail, the carriage has a floor 35, a side wall 36, a roof 37: also upper side wall 39 and a lower side wall 40 which do not touch and which between them define a slot whose purpose will presently be explained. Attached to side wall 36 is a rectangular boss 43 whose surface is relieved to define a race 44. Co-extensive with side walls 39, 40 is a similar boss also having a relieved portion defining a discontinuous race which in effect forms two pockets 48 and 49.

A pin 51 is carried by a link 52 at the anchor point 50 of the chain 53. The pin is provided at each end with rollers 54, 55 which travel in the races 44, 45. The chain 53 is driven by sprocket 57 attached to power take-off shaft 58 which, through gear box 8, is in turn driven by the power take-off shaft of the motor 7.

In FIG. 1 the motor 10, gear box 11, rectifier 12, timer 13 are shown schematically. These are component parts which are purchased commercially.

Suitable components are a 1.5 horsepower variable speed direct current drive motor, Model No. 2Z881, manufactured by Dayton Manufacturing Co. of Chicago, Illinois 60648, equipped with a solid state rectifier for transforming 230 volt, 50 or 60 cycles, alternating current to direct current with a capacity for furnishing variable voltages to the armature of the motor, also made by Dayton Manufacturing Co., and a timer Model 2E213 (Grainger Cat. No.), also manufactured by Dayton Manufacturing Co. Depending upon the size of the unit and the capabilities desired, other models and equivalents may be substituted for the timer, rectifier and motor described, and will be within the skill of persons in the art who have the teachings of this invention before them.

The upper run 59 of the chain 53 is supported by idler rollers 61 attached to arms 62 which are in turn fastened to the vertical wall 28 of the rear C-member 29.

The idler arms 62 are welded to plates 76 which are attached to the vertical wall 28 of the housing 70 by means of two bolts 78, each to prevent the turning of the arm under the weight of the chain 53 on the roller 61.

An idler sprocket 57a supports the distant end of the chain 53.

A nylon wear strip 64 is provided on the floor 65 of rear C-member 29. The lower run 66 of the chain 53 rides on the wear strip 64 as does the floor 35 of the carriage. The floor 35 is relieved at 68 to accommodate the wear strip 64. Nylon wear strips 69 are also provided at the corners of the carriage 53 to reduce the friction between the carriage and the housing 70.

Fastened to the floor of the carriage is a tether ring 71 which provides means for attaching the animal to the carriage.

In FIG. 10 a means for putting the proper tension on the chain is shown. The idler sprocket 57a is mounted by means of roller bearings 99 on one end of an axle 100, the other end of which is welded to a plate 90. The plate is moveable longitudinally of the rear C-member 29 by means of elongate slots provided in the plate to receive retainer pins 91, which are capped by retainers 93. The plate 90 carries at one end a flange 94 normal to the plate, which flange is topped to receive a threaded end of a bolt. The bolt passes through a clearance hole 98 in the end plate 74a of the housing and is engaged by the knob 97. By screwing the knob in the appropriate direction tension on the chain 53 can be adjusted as needed.

OPERATION OF THE ANIMAL EXERCISER

Figure 4:
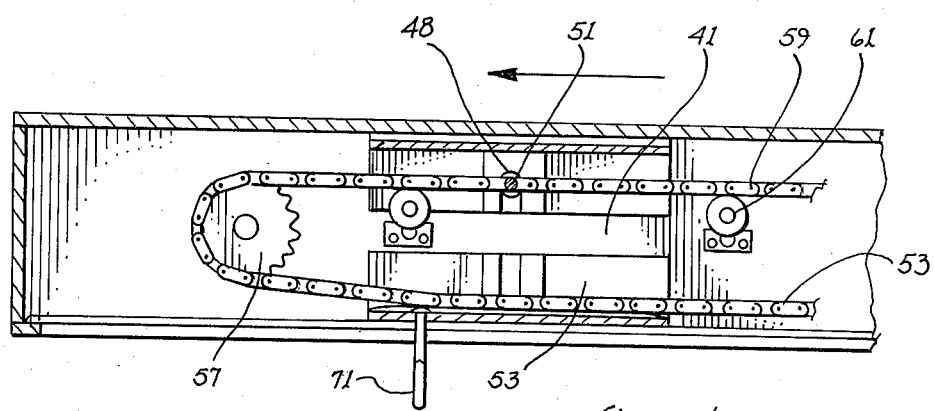
FIG. 4 is a view of the apparatus as shown in FIGS. 2 and 3, in section, taken along the lines 4—4 from FIG. 3.
Figure 5:
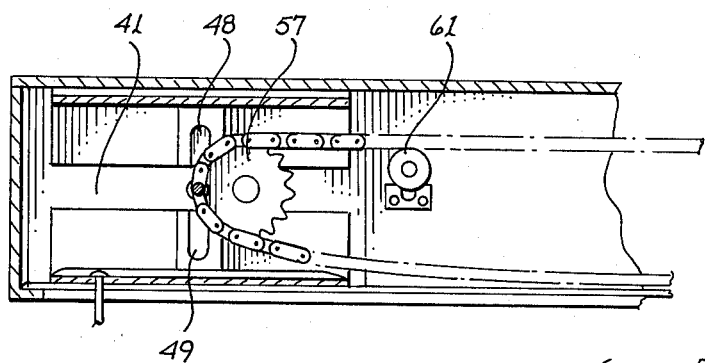
FIG. 5 is the view of FIG. 4 showing the advancement of the carriage to the end of the line of travel.
Figure 6:
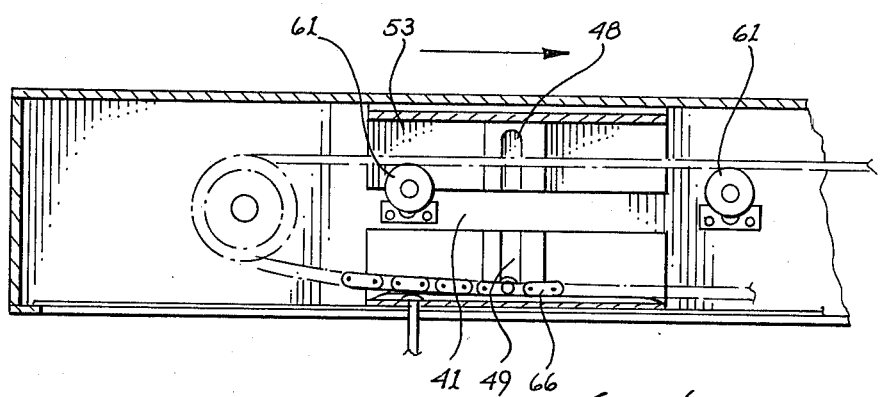
FIG. 6 is the view of FIGS. 4 and 5 wherein the carriage has reversed direction and departed from the end of the line of travel.

The operation can best be understood by reference to FIGS. 4–6. The horse or other animal is first attached to the tether ring 71 by means which should include a standard break-away safety link. After the timer 14 is set and the desired speed of the motor is regulated by means of adjusting rectifier 12, the apparatus is started. In FIG. 4 the upper run 59 is proceeding in the direction of the arrow. The pin engages the upper pocket 48 in one carriage engaging position and moves the carriage 53 in the direction of travel of the upper run 59 of the chain 53 as indicated by the arrow.

As seen in FIG. 5, when the anchor point begins to round the sprocket 57 it drops from upper pocket 48 down to lower pocket 49 in another carriage engaging position, at which point the lower run 66 assumes control of the carriage 53 and moves it in the opposite direction, thus effectively reversing the line of travel of the carriage.

It can also be clearly seen, with reference to FIGS. 4 and 6, that the arms of the idler pulleys 61 pass through the slots 41 defined by the upper and lower side walls 39, 40. The pin 51 carrying roller 55 is the one that engages the upper and lower pockets. Roller 54 travels in the race 44 that is continuous, there being no need to by-pass idler arms on that side of the carriage. Thus, there is no strain or distortion to one side of the chain 53 which would occur if only one end of a pin were operatively engaged in moving the carriage.

The advantages to the animal and its owner are many. The apparatus is strong enought to govern even the most stubborn and recalcitrant animal, yet safety can be provided with a bread-away safety link.

Colic can be walked off a horse without the long hours and fatigue to human operators generally associated with the problem.

The speed and duration of the exercise can be preset for convenience.

The height can be set to hold the animal's head up high and teach him good posture.

By setting the speed properly, an animal can be taught to walk at a fast (compared to usual slow) pace, making the animal much more valuable.

The animal can be taught to turn at voice command by coupling the apparatus with recordings pre-set to just anticipate the turning that the horse must do in response to the apparatus' control. Start and stop could also be integrated into such a program.

The straight run avoids the sore shoulders often seen in connection with circular horse walkers.

Applicant has described a presently preferred embodiment of the invention. The example given is not exhaustive of the equivalents embraced by the invention. For example, without limitation, the means for moving and reversing the direction of travel of the carriage could take other forms, such as electronic self propulsion and switching for reversal. Other equivalents can be readily devised by persons skilled in the art who have the benefit of the teachings of this specification. All such as may be fairly embraced within the appended claims are intended as the scope of invention without necessarily any limitation to the presently preferred embodiments set forth above.

What is claimed is:

1. Apparatus for exercising and training animals comprising:
   (a) a carriage;
   (b) means for attaching an animal to said carriage;
   (c) transportation means for supporting and reciprocally moving said carriage along a substantially straight line of travel comprising:
      (1) an endless belt having first and second courses travelling in opposite directions;
      (2) means for moving said belt along the line of travel;
      (3) means for moving and reversing the direction of travel of said carriage responsive to the movement of said belt comprising a connecting member having a first part engaging said carriage and a second part engaging an anchor point on said endless belt, said first part adapted to move from a first carriage engaging position to a second carriage engaging position responsive to the movement of said anchor point between said first and second courses; and
   (d) means for supporting said transportation means and carriage.

2. The apparatus of claim 1 wherein said means for moving said belt comprise a motor, means for regulating the speed of said motor, and means for regulating the time duration of operation of said motor.

3. The apparatus of claim 1 with the addition of means for adjusting the tension on said belt.

4. The apparatus of claim 1 wherein said reversing means comprises:
   (a) a pin carried by said endless belt at said anchor point and having at least one projecting end;
   (b) means defining a race communicating between said first and second carriage engaging positions, said means operatively associated with said carriage and adapted to engage said pin, whereby said pin moves in the race from one carriage engaging position to the other as said anchor point moves from one course to the other; thereby reversing the direction of travel of said carriage.

5. The apparatus of claim 4 wherein said pin has two ends operably engaged and two races are provided in said carriage to receive said two ends.

6. The apparatus of claim 5 with the addition of idler rollers for supporting a run of said belt, and wherein one of said races has a discontinuous portion thereby defining two pockets, one at said first carriage engaging position and a second at said second carriage engaging position, whereby said idlers pass through said discontinuous portion and the second end of said pin transfers between said pockets responsive to the movements of said anchor point from one course to the other.

7. The apparatus of claim 1 wherein said frame means comprises a housing member adapted to receive and moveably support said carriage, means in said housing defining a slot along the line of travel and adapted to receive said means for attaching an animal to said carriage, and support means for supporting and anchoring said apparatus at a desired elevation.

8. The apparatus of claim 7 wherein said housing member comprises a first portion supported by said support means, and a second portion removeably joined to said first portion.

9. The apparatus of claim 7 wherein said means for moveably supporting said carriage in said housing comprises slidable wear strip means.

* * * * *